(12) United States Patent
Floyd et al.

(10) Patent No.: US 10,324,958 B2
(45) Date of Patent: Jun. 18, 2019

(54) EXTRACTION, AGGREGATION AND QUERY OF MAINTENANCE DATA FOR A MANUFACTURED PRODUCT

(71) Applicant: THE BOEING COMPANY, Huntington Beach, CA (US)

(72) Inventors: Joseph Frank Floyd, University Place, WA (US); Patrick J. Eames, Newcastle, WA (US); Brent Louis Hadley, Kent, WA (US); Robert James Martin, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 571 days.

(21) Appl. No.: 15/073,451

(22) Filed: Mar. 17, 2016

(65) Prior Publication Data

US 2017/0270182 A1    Sep. 21, 2017

(51) Int. Cl.
| | |
|---|---|
| G06F 16/25 | (2019.01) |
| G06Q 10/06 | (2012.01) |
| G06F 16/28 | (2019.01) |
| G06Q 10/00 | (2012.01) |
| G06F 16/81 | (2019.01) |
| G06F 16/93 | (2019.01) |
| G06F 16/2457 | (2019.01) |
| G06Q 10/10 | (2012.01) |

(52) U.S. Cl.
CPC ...... *G06F 16/285* (2019.01); *G06F 16/24575* (2019.01); *G06F 16/254* (2019.01); *G06F 16/81* (2019.01); *G06F 16/93* (2019.01); *G06Q 10/06316* (2013.01); *G06Q 10/10* (2013.01); *G06Q 10/20* (2013.01)

(58) Field of Classification Search
USPC .................................... 707/602, 736
See application file for complete search history.

(56) References Cited

U.S. PATENT DOCUMENTS

| | | | | |
|---|---|---|---|---|
| 6,006,225 | A * | 12/1999 | Bowman | G06F 17/30395 |
| 8,266,066 | B1 * | 9/2012 | Wezter | G06Q 10/10 |
| | | | | 703/20 |
| 2002/0052878 | A1 * | 5/2002 | Brandin | G06F 17/2247 |

(Continued)

FOREIGN PATENT DOCUMENTS

EP    2 988 277 A1    2/2016

OTHER PUBLICATIONS

Extended European Search Report dated Feb. 22, 2017 in European patent application No. 16206871.2.

(Continued)

*Primary Examiner* — Cheyne D Ly
(74) *Attorney, Agent, or Firm* — Womble Bond Dickinson (US) LLP

(57) ABSTRACT

A method is provided that includes receiving a first electronic document for a manufactured product, with the first electronic document including first data regarding the manufactured product. The method includes extracting the first data from the first electronic document. And the method includes correlating the first data so extracted and second data regarding the manufactured product to produce aggregated data including the first data and second data, and storing the aggregated data in a storage from which the aggregated data is queryable.

15 Claims, 11 Drawing Sheets

(56) References Cited

U.S. PATENT DOCUMENTS

| | | | |
|---|---|---|---|
| 2003/0088562 A1* | 5/2003 | Dillon | G06F 16/30 |
| 2004/0148278 A1* | 7/2004 | Milo | G06F 17/2205 |
| 2007/0100816 A1* | 5/2007 | Muroi | G06F 16/93 |
| 2009/0248666 A1* | 10/2009 | Ahluwalia | G06F 17/3064 |
| 2013/0226967 A1* | 8/2013 | Gross | G06Q 10/0633 |
| | | | 707/770 |

OTHER PUBLICATIONS

Shannon P. Ackert, "Basics of Aircraft Maintenance Programs for Financiers", Evaluation & Insights of Commercial Aircraft Maintenance Programs, Oct. 2010, pp. 1-22.

\* cited by examiner

300 →

AIRPLANE MODEL XX-XXX
TASK CARDS

| DATE | TAIL NUMBER | STATION | AIRLINE CARD NO. | TASK CARD NO. 21-XXX-XX | MECH | INSP |
|---|---|---|---|---|---|---|
| | | | | | | |

TASK 21-YYY-YY
2. RECIRCULATION AIR FILTER INSTALLATION
   (FIGURE 1 OR FIGURE 2)
   A. EXPENDABLES/PARTS

| AMM ITEM | DESCRIPTION | AIPC REFERENCE | AIPC EFFECTIVITY |
|---|---|---|---|
| 3 | FILTER | 21-AA-BB-CC-DD | 1,2,3 |
| | | 21-AA-BB-CC-DD | 4,5,8 |
| | | 21-AA-BB-CC-DD | 6,7 |
| | | 21-AA-BB-CC-DD | 9-15 |

304

B. RECIRCULATION AIR FILTER INSTALLATION

*FIG. 3A*

```
<title>Expendables/Parts</title>
<table FRAME="NONE">
<tgroup COLS="4" COLSEP="0" ROWSEP="0">
<colspec COLNAME="COL1" COLWIDTH="20*"><colspec COLNAME="COL2" COLWIDTH="50*"><colspec COLNAME="c
<row ROWSEP="1">
<entry>
<para>AMM ITEM</par a>
</entry>
<entry>
<para>Description</para>
</entry>
<entry>
<para>AIPC Reference</para>
</entry>
<entry>
<para>AIPC Effectivity</para>
</entry>
</row>
</thead>
<tbody>
<row>
<entry>
<para>3</para>
</entry/>
<para>Filter</para>
<entry>
<entry>
<para><refext REFMAN="AIPC" RELOC="21-AA-BB-CC-DD">21-AA-BB-DD-DD</refext></para>
</entry>
<entry>
<para>TBD ALL</para>
</entry>
</row>
</tbody>
```

*FIG. 3B*

```
<ITEM CHAPNBR="21" SECTNBER="AA" UNITNBR="BB" FIGNBR="CC" ITEMNBR="DD" PLUSIND="1" INDENT="2" ATA
  <EFFECT EFFRG="001999">
  <PNRMFR><PNR>AAAAAAA</PNR>
  <MFR>BBBBB</MFR>
  </PNRMFR>
  <UPA>2</UPA>
  <TQA>AR</TQA>
  <LBL>&MDD;</LBL>
  <MSC>HEPA-LIKE FILTER 99.9 PERCENT EFFICIECY</MSC>
  <LBL>&TOD;</LBL>
  <REFEXT REFLOC="21-AA-BB" REFMODEL="737-600/700/800" REFSPL="CCCCC" REFMAN="AMM">21-AA-BB</REFEXT>
  <LBL>&LID;</LBL>
</ITEM>
```
— 402

TC-IPC SHREDDER   HOME   ABOUT   CONACT

🔍 SEARCH
SEARCH FOR PARS AND OPTIONAL PARTS THAT CORRESPOND TO ASSOCIATED TASK CARDS.

AIRLINE
AIRCRAFT MODEL
EFFECTIVITY    XX001
               XX002
               XX004
               XX005
               XX006
               XX001
               XX002
               XX011

TASK CARD (STARTS-WITH)
EXPORT TO EXCEL (CSV)

SEARCH

EXTRACTION, AGGREGATION AND QUERY OF MAINTENANCE DATA FOR A MANUFACTURED PRODUCT

TECHNOLOGICAL FIELD

The present disclosure relates generally to maintenance of a manufactured product and, in particular, to extraction, aggregation and query of maintenance data for a manufactured product such as an aircraft.

BACKGROUND

Original equipment manufacturers (OEMs) of structural products and particularly complex structural products such as aircraft and other vehicles provide their customers with multiple documents and data sources to help their customers to safely and efficiently maintain and operate their products. In the context of aircraft, an OEM may provide their airline customers with numerous electronic documents including maintenance documents, operations documents, engineering diagrams, technical drawings, wiring diagrams and the like. Each of these documents may provide information about a specific system, subsystem or part of the structural product, or address a specific type of maintenance action (e.g., fix an electrical wiring problem). All of these documents are authored in such a way as to enable a user such as maintenance personnel to locate information in order to perform a task, to gain knowledge, to help troubleshoot a problem with some system, etc.

Many times a maintenance person will need to look up and extract the same type of information from multiple documents or multiple locations in a document. For example, before an airline performs a maintenance check for one of their aircraft, it is useful to anticipate, purchase and make available all of the materials (parts, consumable materials, etc.) that may be required for that maintenance check so that all of the maintenance tasks that may be performed during that maintenance check may be efficiently accomplished without delay. This often requires significant, time-consuming research of the maintenance tasks, and find out what parts may be required to perform the maintenance tasks. This research is not only time consuming for the user, but also requires significant computing resources to search through multiple documents.

BRIEF SUMMARY

Example implementations of the present disclosure are directed to an improved apparatus, method and computer-readable storage medium for extraction, aggregation and query of maintenance data. Example implementations compile data from multiple electronic maintenance documents to enable one to query the resulting aggregated data to find information that may be located in multiple documents or multiple locations in a document. This may not only reduce the time required for a user to research maintenance tasks, but may also reduce the computing resources required to search through the data from multiple electronic documents.

The present disclosure thus includes, without limitation, the following example implementations. In some example implementations, a method is provided that includes receiving a first electronic document (e.g., a first electronic maintenance document) for a manufactured product, the first electronic document including first data regarding the manufactured product; extracting the first data from the first electronic document; correlating the first data so extracted and second data regarding the manufactured product to produce aggregated data including the first data and second data; and storing the aggregated data in a storage from which the aggregated data is queryable.

In some example implementations of the method of the preceding or any subsequent example implementation, or any combination thereof, the method further comprises receiving a second electronic document (e.g., second electronic maintenance document) for the manufactured product, the second electronic document including the second data; and extracting the second data from the second electronic document, wherein the second electronic document is received, and the second data is extracted, before the first data and second data are correlated.

In some example implementations of the method of any preceding or any subsequent example implementation, or any combination thereof, the method further comprises receiving a third electronic document (e.g., third electronic maintenance document) for the manufactured product, the third electronic document including third data regarding the manufactured product; extracting the third data from the third electronic document; correlating the aggregated data and the third data so extracted to produce further aggregated data including the aggregated data and third data; and storing the further aggregated data in the storage from which the further aggregated data is queryable.

In some example implementations of the method of any preceding or any subsequent example implementation, or any combination thereof, correlating the first data and second data includes correlating items of the first data and items of the second data, and wherein correlating the aggregated data and the third data includes correlating the items of first data and items of third data, and thereby correlating the items of second data and the items of third data, the items of third data otherwise being incapable of correlation with the items of second data.

In some example implementations of the method of any preceding or any subsequent example implementation, or any combination thereof, the first data and second data are in a markup language format, and items of the first data and items of the second data are encapsulated by tags of the markup language format, and wherein correlating the first data and second data includes correlating the items of first data and items of the second data based at least in part on the tags.

In some example implementations of the method of any preceding or any subsequent example implementation, or any combination thereof, the first data is in a markup language format, and correlating the first data and second data includes recognizing items of the first data and their relationship to items of the second data independent of the markup language format.

In some example implementations of the method of any preceding or any subsequent example implementation, or any combination thereof, the method further comprises receiving a search query; executing the search query on the aggregated data, including retrieving items of first data and correlated items of second data; and producing a response to the search query including the items of first data and correlated items of second data.

In some example implementations of the method of any preceding or any subsequent example implementation, or any combination thereof, the first electronic document is a task card manual with first data including a description of tasks on or using parts of the manufactured product, and the second electronic document is an illustrated parts catalog with second data including a description of the parts of the manufactured product, and wherein the method further comprises receiving a search query for a task card from the task card manual; executing the search query on the aggregated data, including retrieval of a description of a maintenance task covered by the task card from the first data, and a list of parts for the maintenance task from the second data; and producing a response to the search query including the description of the maintenance task and the list of parts for the maintenance task.

In some example implementations, an apparatus is provided that comprises a processor and a memory storing executable instructions that, in response to execution by the processor, cause the apparatus to at least perform the method of any preceding example implementation, or any combination thereof. This may include implementation of an integrated data extraction, aggregation and query system configured to perform steps of the method.

In some example implementations, a computer-readable storage medium is provided. The computer-readable storage medium is non-transitory and has computer-readable program code portions stored therein that, in response to execution by a processor, cause an apparatus to at least perform the method of any preceding example implementation, or any combination thereof.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as intended, namely to be combinable, unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE DRAWING(S)

Having thus described example implementations of the disclosure in general terms, reference will now be made to the accompanying drawings, which are not necessarily drawn to scale, and wherein:

FIGS. 3A and 3B illustrate respectively a portion of a task card from a task card manual (TCM) and its corresponding Standard Generalized Markup Language (SGML) marked data, according to various example implementations;

FIGS. 4A and 4B illustrate respectively a portion of a page from aircraft illustrated parts catalog (AIPC) and its corresponding SGML marked data, according to various example implementations;

FIGS. 5 and 6 illustrate graphical user interfaces (GUIs) that may be provided by a query subsystem, according to various example implementations;

DETAILED DESCRIPTION

Figure 1:
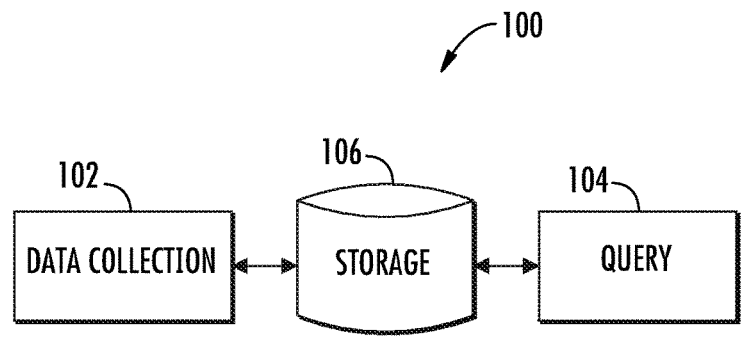
FIG. 1 illustrates an integrated data extraction, aggregation and query system according to various example implementations of the present disclosure.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference to something as being a first, second or the like should not be construed to imply a particular order. Also, for example, reference may be made herein to quantitative measures, values, relationships or the like (e.g., planar, coplanar, perpendicular). Unless otherwise stated, any one or more if not all of these may be absolute or approximate to account for acceptable variations that may occur, such as those due to engineering tolerances or the like. Like reference numerals refer to like elements throughout.

Example implementations of the present disclosure relate generally to maintenance of a manufactured (structural) product. More particularly, various example implementations relate to extraction, aggregation and query of maintenance data for a manufactured product. Example implementations will be primarily described in conjunction with aerospace applications in which the manufactured product is an aircraft. It should be understood, however, that example implementations may be utilized in conjunction with a variety of other applications, both in the aerospace industry and outside of the aerospace industry. Other examples of suitable manufactured products include any of a number of different types of vehicles, such as spacecraft, watercraft, motor vehicles, railed vehicles and the like. Furthermore, it should be understood that unless otherwise specified, the terms "data," "content," "information," and similar terms may be at times used interchangeably.

FIG. 1 illustrates an integrated data extraction, aggregation and query system 100 for maintenance of a manufactured product, according to some example implementations of the present disclosure. The integrated data extraction, aggregation and query system may include one or more of each of any of a number of different subsystems (each an individual system) for performing one or more functions or operations of the integrated data extraction, aggregation and query system. As shown, for example, the system may include data collection and query subsystems 102, 104 coupled to a storage 106. Although being shown together as part of the system, it should be understood that either of the subsystems or storage may function or operate as a separate system without regard to the other. And further, it should be understood that the system may include one or more additional or alternative subsystems than those shown in FIG. 1.

In accordance with example implementations of the present disclosure, maintenance data for a manufactured product may be provided from a number of different sources, including electronic documents, databases and the like. As described herein, an electronic document (or simply document) may be any electronic media content capable of being visualized in an electronic and/or printed (or printable) form. A document may be composed of one or more constituent document components that may be groupings of its media content such as between basic breaking points. The document components may depend on the type of document and may include, for example, electronic pages, slides, diagrams, drawings, still images, videos or the like. The document component may at times be generally referred to as a "page," although the document component need not necessarily be an electronic page as it may include other types of components. In instances in which a document includes only one component, the document and its component may be one and the same.

Each page of a document may be formed of data from which a visual representation such as an image of it (or rather its media content) may be generated in an electronic and/or printed (or printable) form. In some examples, an electronic document and in turn its pages may be in a markup language format including data encapsulated by tags. One example of a suitable markup language is the Standard Generalized Markup Language (SGML). Other examples of suitable markup languages include Scribe, Generalized Markup Language (GML), HyperText Markup Language (HTML), Extensible Markup Language (XML), Extensible HTML (XHTML) and the like.

In various examples, one or more sources of data may be for a manufactured product or other complex system such as an aircraft that may be generally composed of one or more divisions each of which may be composed of one or more systems of subsystems, assemblies, components and the like. In this regard, the components of the manufactured product may be assembled into a number of assemblies, which in turn may be assembled into a number of subsystems of the manufactured product. The subsystems may be assembled into systems, and the systems assembled or otherwise grouped into divisions of the manufactured product. In the context of an aircraft, one or more components, assemblies, subsystems or systems may be designed as a modular component of the aircraft often referred to as a line-replaceable unit (LRU), of which a single aircraft may include a number of LRUs and other components, assemblies, subsystems or systems. Any of the manufactured product itself or any of its divisions, systems, subsystems, assemblies, components or the like may at times be generally referred to as a "part" of the manufactured product.

A source of data regarding a manufactured product may be generally referred to herein as a "source of data," or more particularly in some examples, a "source of maintenance data." Similarly, a document that includes data regarding a manufactured product may be generally referred to herein as a "document," or more particularly in some examples, a "maintenance document." Data regarding a manufactured product may include, for example, maintenance data, operations data, engineering diagrams, technical drawings, wiring diagrams and the like (any generally referred to as a "source of maintenance data"). A source of maintenance data may be composed of or otherwise include data that describe the manufactured product. Depending on the manufactured product, this data may describe the manufactured product at any of a number of different levels, such as at the product-level, division-level, system-level, subsystem-level, assembly-level or component-level.

In addition to or in lieu of the manufactured product, a source of maintenance data may be composed of or otherwise include data that describe or one or more maintenance or operations tasks on or using one or more parts of the manufactured product (either generally referred to as a "maintenance task"). These may include maintenance tasks as for operation, installation, maintenance, repair, removal, replacement or testing of part(s) of the manufactured product. Some maintenance tasks may include multiple subtasks, and some subtasks may include multiple maintenance actions. Again depending on the manufactured product, this data may describe a maintenance task at any of a number of different levels, such as at the task-level, subtask-level or maintenance-action level.

Examples of suitable sources of aircraft maintenance data include, again, engineering diagrams, technical drawings, wiring diagrams and the like. Other examples of suitable sources of aircraft maintenance data include an aircraft illustrated parts catalog (AIPC), aircraft flight manual (AFM), aircraft maintenance manual (AMM), aircraft recovery manual (ARM), airworthiness directive (AD), component maintenance manual (CMM), component maintenance manual parts list (CMMIPL), configuration change support data (CCSD), configuration deviation list (CDL), consumable products manual (CPM), engine (shop) manual (EM), engineering drawings (ED), equipment list (EL), dispatch deviation guide (DDG), engine cleaning inspection and repair manual (CIR), engine illustrated parts catalog (EIPC), engine parts configuration management section (EPCM), fault repair manual (FRM), fault reporting and fault isolation manual (FRM/FIM), flight crew operations manual (FCOM), general maintenance manual (GMM), illustrated tool and equipment manual (ITEM), in-service activity report (ISAR), maintenance planning document (MPD), maintenance review board report (MRB), maintenance synoptics, maintenance tips (MT), maintenance training manual (MTM), master minimum equipment list (MMEL), non-destructive testing manual (NDT), power plant build-up manual (PPBM), power plant build-up manual illustrated parts list (PPBMIPL), production management database (PMDB), repair record, service bulletin (SB), service bulletin index (SBI), service letter (SL), structural repair manual (SRM), systems description section (SDS), system schematics manual (SSM), task card manual (TCM), tool and equipment manual (TEM), weight and balance manual (WBM), wiring diagram manual (WDM) or the like. These sources may be formatted in any of a number of different manners, including as electronic documents, databases or the like.

As explained in greater detail below, then, the data collection subsystem 102 of the integrated data extraction, aggregation and query system 100 may be generally configured to receive sources of data such as maintenance documents, databases and the like for a manufactured product, and extract and aggregate data regarding the manufactured product from those sources. The storage 106 may be generally configured to store the aggregated data. And the query subsystem 104 may be generally configured to receive a search query for data regarding the manufactured product, and produce a response including items of data from the aggregated data in the storage.

Figure 2A:
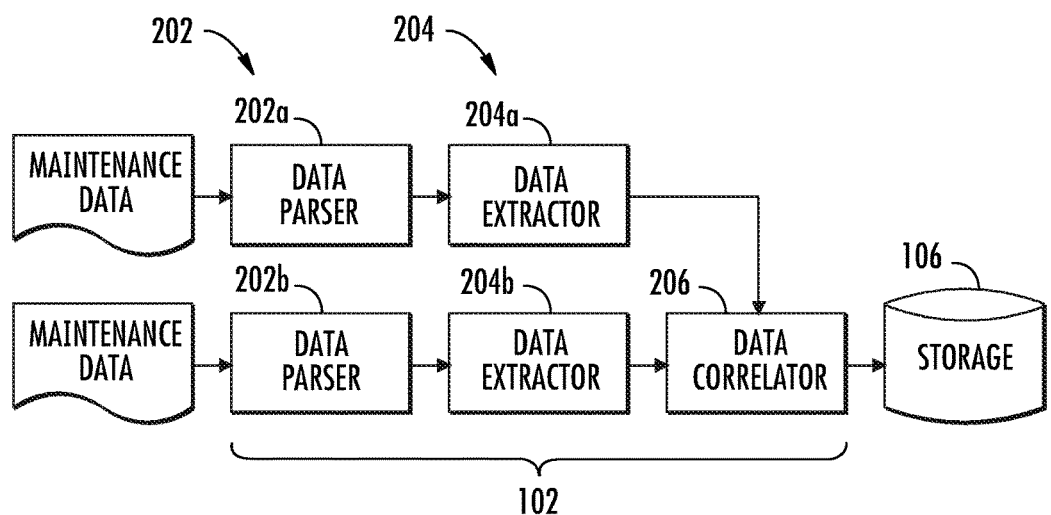
FIGS. 2A and 2B illustrate a data collection subsystem according to various example implementations.
Figure 2B:
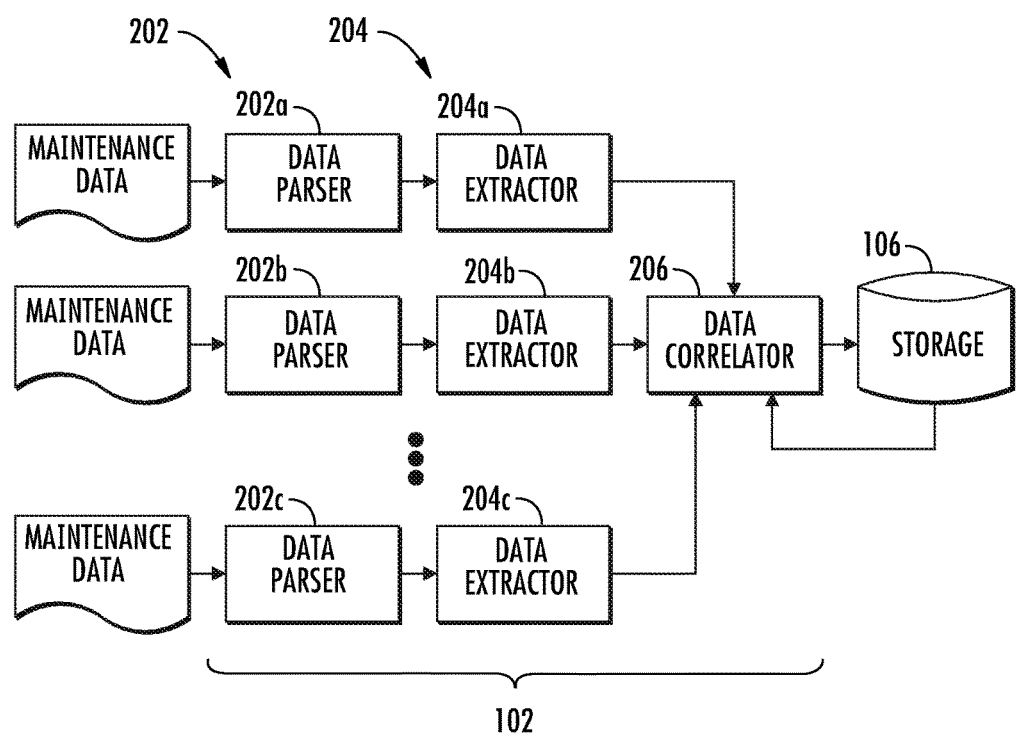

FIGS. 2A and 2B illustrate more particularly the data collection subsystem 102 according to example implementations of the present disclosure. The data collection subsystem may include one or more of each of any of a number of different elements for performing one or more functions or operations of the data collection subsystem. As shown, for example, the data collection subsystem may include a data parser 202, data extractor 204 and/or data correlator 206. Although being shown together as part of the data collection subsystem, it should be understood that any of the data parser, data extractor or data correlator may function or operate as a separate system or subsystem without regard to the others. And further, it should be understood that the data collection subsystem may include one or more additional or alternative elements than those shown in FIG. 2.

FIG. 2A illustrates in particular first and second data parsers 202a, 202b, and first and second data extractors 204a, 204b, configured to operate on respectively first and second sources of data for a manufactured product such as an aircraft. As described below, these sources of data may be electronic documents (first and second documents) such as maintenance documents with maintenance data, although it should be understood that in some examples, at least the second source of data may be formatted in another manner (e.g., as a database). As also described below, the data may include maintenance data in electronic maintenance documents (e.g., first and second maintenance documents), although it should be understood that the data need not be maintenance data, and the documents need not be maintenance documents.

In some example implementations, the first and second maintenance documents may include respectively first and second data regarding the manufactured product, and in a markup language format such as SGML. More particularly, for example, the first electronic maintenance document may be a task card manual with first data including a description of maintenance tasks on or using parts of the manufactured product. The second electronic maintenance document may be an illustrated parts catalog with second data including a description of the parts of the manufactured product.

Although shown in FIG. 2A as including two data parsers 202 and data extractors 204, it should be understood that the data collection subsystem 102 may include fewer or more data parsers and data extractors. As described in greater detail below, FIG. 2B further illustrates a third data parser 202c and data extractor 204c for a third document (e.g., third maintenance document) including third data regarding the manufactured product. It should also be understood that each data parser and data extractor may be configured to operate on more than one source of maintenance data. The data collection subsystem may therefore in some examples include a single data parser and data extractor configured to operate on multiple sources of maintenance data.

The first and second data parsers 202a, 202b may be configured to receive respectively first and second electronic maintenance documents. Each data parser may disassemble a respective maintenance document into a plurality of constituent pages or other suitable components each of which includes respective data. The maintenance document may be received from any of a number of different sources such as from a file storage, database storage, cloud storage or the like. The data parser may be configured to disassemble its respective maintenance document in any of a number of different manners. In one example, the data parser may be may be configured to disassemble its maintenance document according to the maintenance document (e.g., TCM, AIPC) or type of maintenance document (e.g., engineering diagram, technical drawing, wiring diagram, manual, etc.). The data parser may therefore also be configured to identify the type of the maintenance document, such as based on the format of the document, business rules or by user input.

The first and second data extractors 204a, 204b may be configured to extract respectively first and second data from the disassembled pages of respectively the first and second maintenance documents. Each data extractor may extract data from the disassembled pages of a respective maintenance document in any of a number of different manners, and the extracted data may in some examples depend on the maintenance document or type of maintenance document. In the context of an aircraft TCM composed of constituent task cards (document components) with data describing maintenance tasks, the data extractor may extract from each task card, task numbers, maintenance actions, expendable aircraft parts and the like. For an AIPC, the data extractor may extract part numbers, Air Transport Association (ATA) codes, quantity and the like.

The data correlator 206 may be configured to receive and correlate the first and second data so extracted by the first and second extractors 204a, 204b to produce aggregated data. The data correlator correlates the data in any of a number of different manners. In some examples, items of the first data and items of the second data in respectively the first electronic maintenance document and second electronic maintenance document are encapsulated by tags of the markup language format (e.g., SGML). In these examples, the data correlator may correlate the items of first data and items of the second data based at least in part on the tags, such as in the case of a common tag that may be used to link the first data and second data. In some examples, one or more tags may be inferred from the data itself and their relation to other data without regard to the markup language format. In these examples, the data correlator may recognize items of the first data and their relationship to items of the second data independent of the markup language format.

The data correlator 206 may be coupled to the storage 106, which may be configured to store the aggregated data produced by the data correlator, and from which the aggregated data is queryable. The aggregated data may be formatted and stored in any of a number of different manners, and hence, the storage may be of any of a number of different types. Examples of suitable types of storage include file storage, database storage, cloud storage or the like.

In the case of more than two sources of maintenance data (e.g., maintenance documents), the data may be extracted and correlated at the same time or in stages. In some examples, data for a plurality of documents (e.g., first and second maintenance documents) may be extracted and correlated to produce aggregated data, and then data for later maintenance documents may be extracted and correlated with the aggregated data to produce further aggregated data, which may be stored in the storage 208. This may be particularly useful in instances in which data for one of the documents is needed to correlate data from two other documents that may otherwise be in capable of correlation.

As shown in FIG. 2B, the third data parser 202c may be configured to receive and disassemble the third electronic maintenance document for the manufactured product. The third data extractor 204c may be configured to extract the third data from the disassembled third electronic maintenance document. The data correlator may then be configured to the aggregated data (in the storage 208) and the third data so extracted to produce further aggregated data including the aggregated data and third data, which may then be placed in the storage. In some examples, the data correlator may correlate the items of first data and items of third data, and thereby correlate the items of second data and the items of third data, with the items of third data otherwise being incapable of correlation with the items of second data.

Figure 4A:
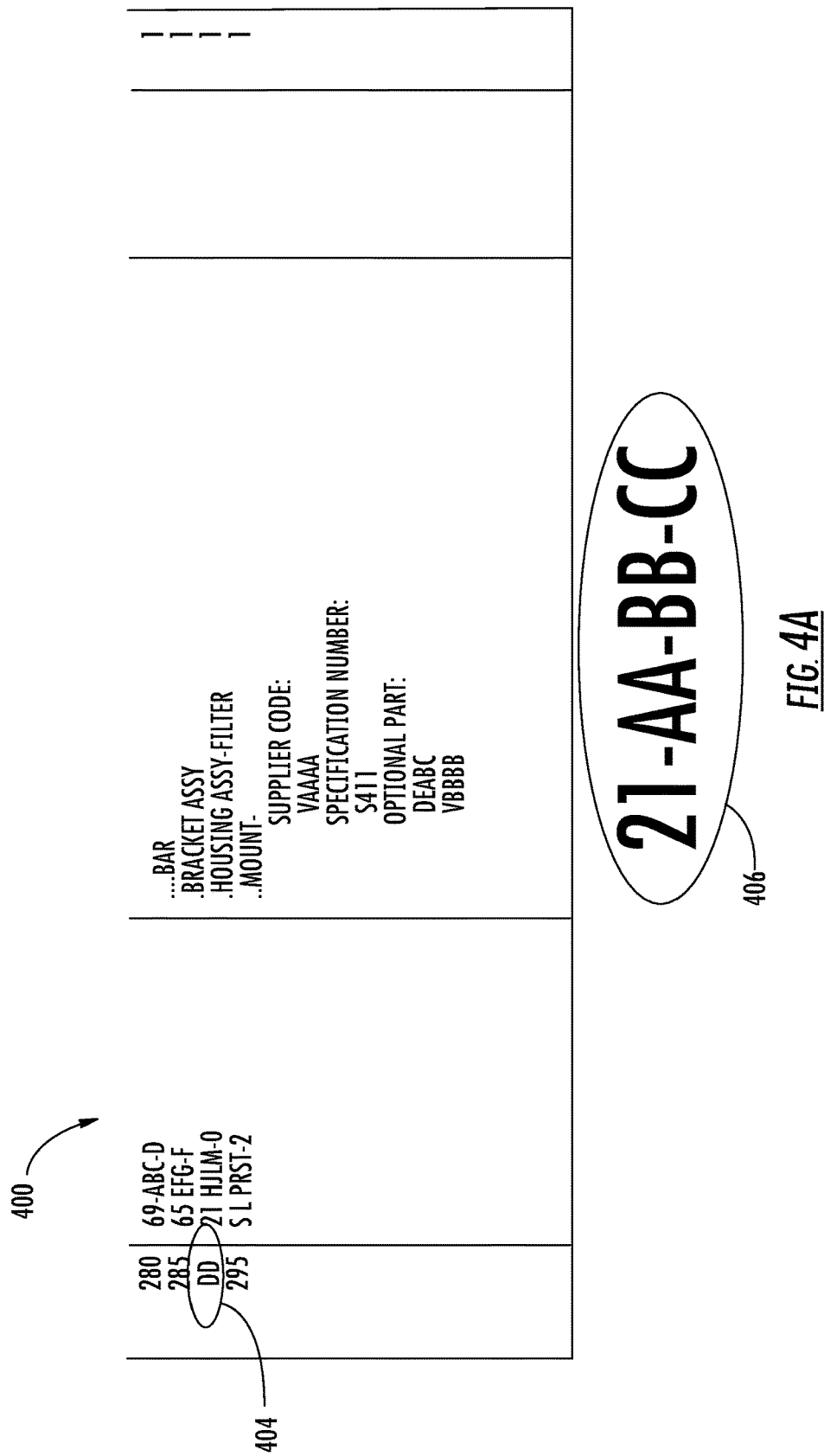

To further illustrate aspects of the data correlator 206, reference is made to FIGS. 3A, 3B, 4A and 4B. FIGS. 3A and 3B illustrate respectively a portion of a task card 300 from a TCM and its corresponding SGML marked data 302, and FIGS. 4A and 4B illustrate respectively a portion of a page 400 from an AIPC and its corresponding SGML marked data 402. As shown, the task card may include an entry 304 that describes a part (a filter) and a reference to that part ("DD") 404 at a location ("21-AA-BB-CC") 406 in the AIPC. Similarly, the SGML marked data for the task card and AIPC may include respective SGML tags 306, 408 that identify the part and location in the AIPC. In these examples, the data correlator may be configured to correlate items of data in the TCM and AIPC based on the SGML tags, or based on inferences that may be made from interpreting the data and their relation without regard to the SGML tags.

Returning to FIG. 1, aggregated (or further aggregated) data stored in the storage 106 may be generally queryable, such as through the query subsystem 104 of the extraction, aggregation and query system 100. As indicated above, the query subsystem may be generally configured to receive a search query for data regarding the manufactured product, and produce a response including items of data from the aggregated data. More particularly, in some examples, the query subsystem may be configured to receive and execute a search query on the aggregated data. Execution of the search query may include retrieval of items of first data and correlated items of second data from the aggregated data. The query subsystem may then produce a response to the search query including the items of first data and correlated items of second data. The response may be produced in any of a number of formats, such as in a table that may be provided in a spreadsheet or other suitable manner. As will be appreciated, the query subsystem may be implemented in a number of different manners, such as in a search engine, database management system or the like.

Figure 6:
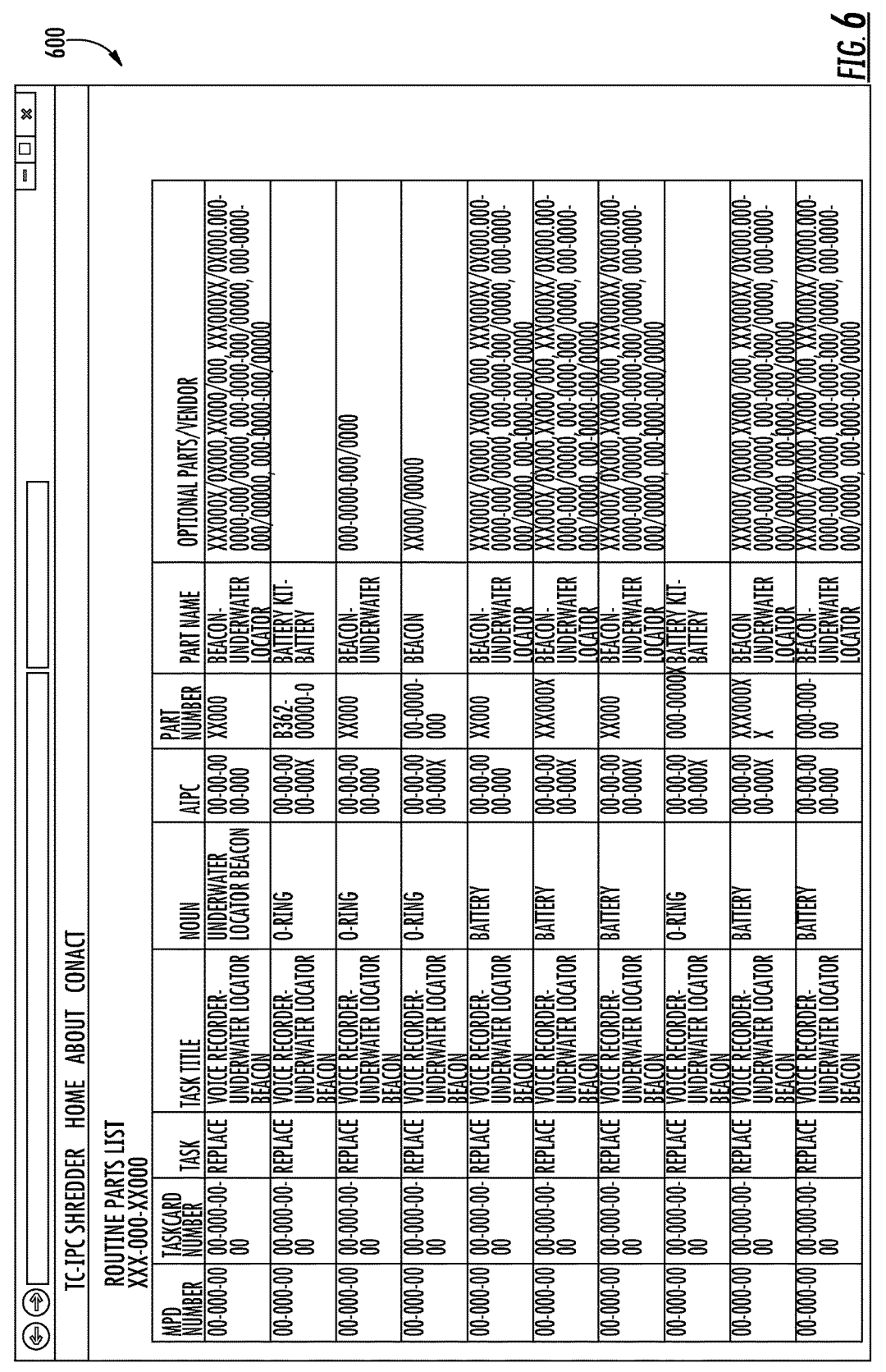

In some examples in which the first maintenance document is a TCM and the second maintenance document is an AIPC, the query subsystem 104 of the extraction, aggregation and query system 100 may receive a search query for a task card from the task card manual. The query subsystem may execute the search query on the aggregated data, including retrieval of a description of a maintenance task covered by the task card from the first data, and a list of parts for the maintenance task from the second data. And the query subsystem may produce a response to the search query including the description of the maintenance task and the list of parts for the maintenance task FIG. 5 illustrates graphical user interface (GUI) 500 that may be provided by the query subsystem 104 in the context of aggregated data from a TCM and AIPC. As shown in FIG. 5, the query subsystem may enable a user to search for parts and optional parts (from an AIPC) that correspond to associated task cards (from a TCM). The query subsystem may retrieve items of data from the TCM for a desired task card and correlated items of data for parts and optional parts from an AIPC, and produce the response to the search query. FIG. 6 illustrates a GUI 600 including aggregated data for a desired task card, including data for maintenance task(s) described by the task card (from the TCM), and data for parts implicated by the task(s) (from the AIPC).

To further illustrate example implementations of the present disclosure, in some more specific implementations, key maintenance documents that an airline needs to maintain their aircraft may be in a common SGML format. The data collection subsystem 102 may take the SGML marked data from each maintenance document and aggregate them into a common storage 106. This may enable a single batch search for data across the maintenance documents. For example, an airline may assemble a list of tasks to be performed on a maintenance check for a specific aircraft on a spreadsheet, and request a report of all the consumable materials required for those tasks. The spreadsheet list may be input into the query subsystem 104, which may search and return descriptions of the parts for each of those tasks from the storage, and compile and return a suitable report.

Figure 7A:
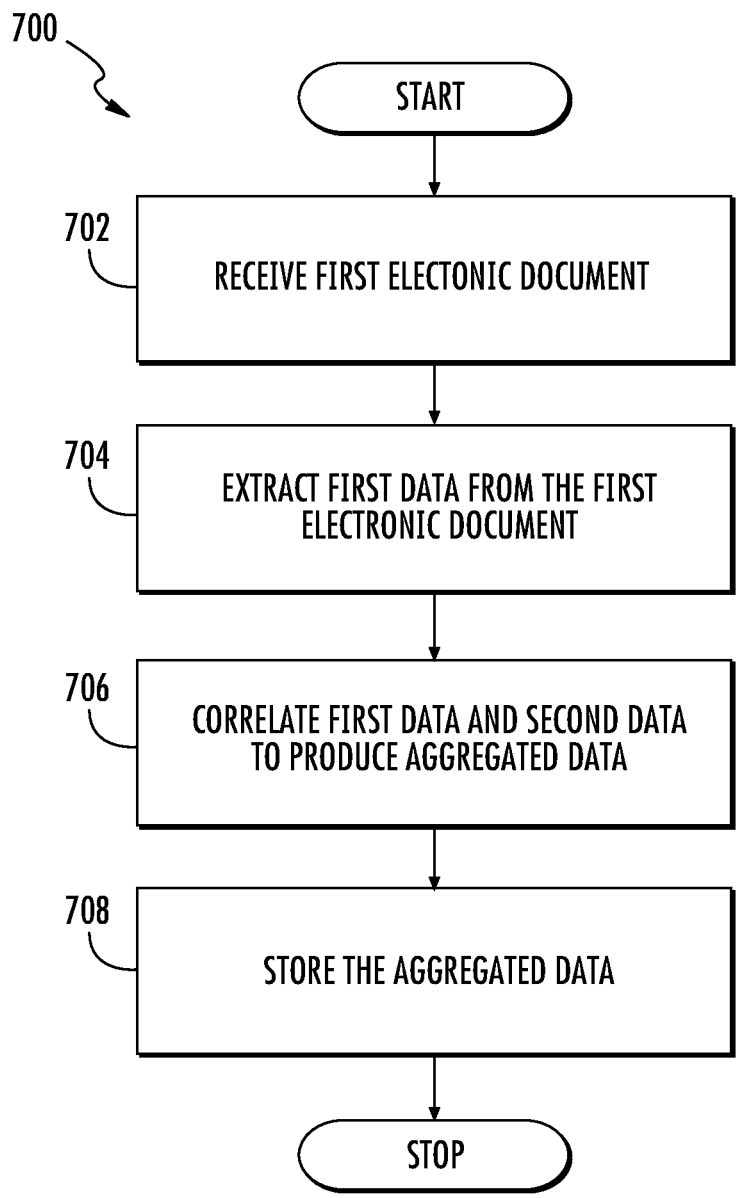
FIGS. 7A and 7B are flowcharts illustrating various steps in a method according to various example implementations.
Figure 7B:
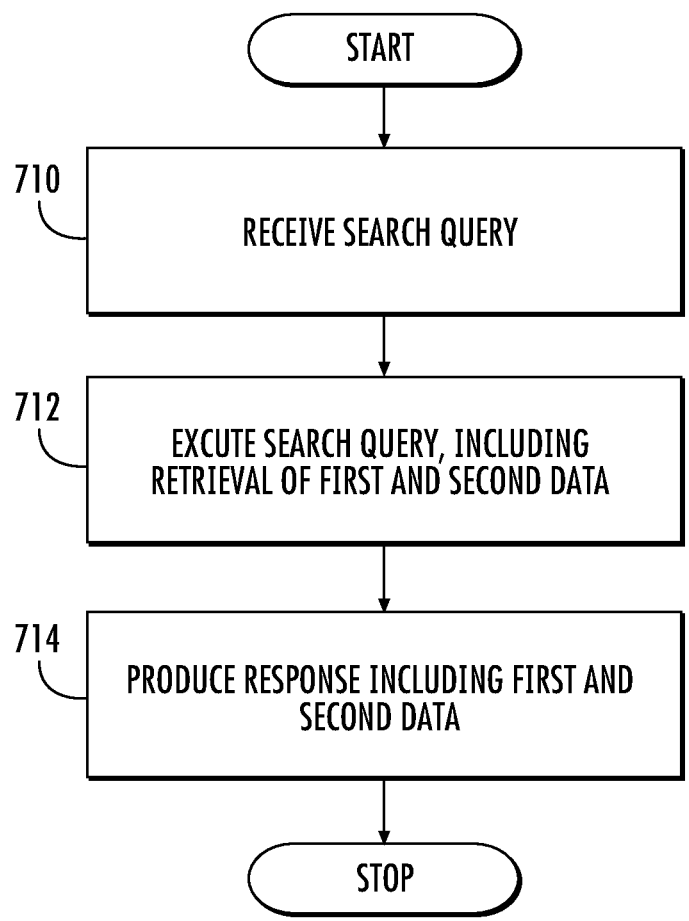

FIGS. 7A and 7B are flowcharts illustrating various steps in a method 700 according to some example implementations of the present disclosure. As shown at block 702, the method may include receiving a first electronic document (e.g., first electronic maintenance document) for a manufactured product, with the first electronic document including first data regarding the manufactured product. The method may include extracting the first data from the first electronic document, as shown at block 704. And the method may include correlating the first data so extracted and second data regarding the manufactured product to produce aggregated data including the first data and second data, and storing the aggregated data in a storage from which the aggregated data is queryable, as shown at blocks 706, 708.

Referring now in particular to FIG. 7B, in some examples, the method may further include receiving a search query, as shown at block 710. The method may include executing the search query, including retrieving items of first data and correlated items of second data from the aggregated data, as shown at block 712. And the method may include producing a response to the search query including the items of first data and correlated items of second data, as shown at block 714.

According to example implementations of the present disclosure, integrated data extraction, aggregation and query system 100 and its subsystems including the data collection and query subsystems 102, 104 and/or storage 106 may be implemented by various means. Means for implementing the system and its subsystems may include hardware, alone or under direction of one or more computer programs from a computer-readable storage medium. In some examples, one or more apparatuses may be configured to function as or otherwise implement the system and its subsystems shown and described herein. In examples involving more than one apparatus, the respective apparatuses may be connected to or otherwise in communication with one another in a number of different manners, such as directly or indirectly via a wired or wireless network or the like.

Figure 8:
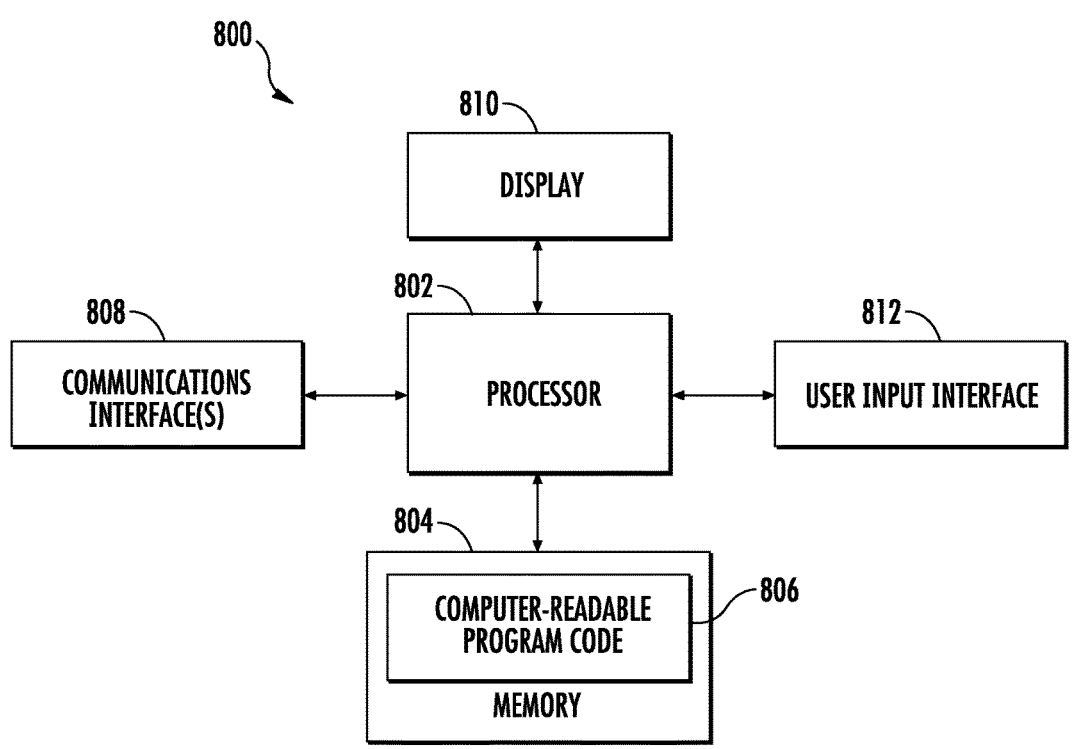
FIG. 8 illustrates an apparatus according to some example implementations.

FIG. 8 illustrates an apparatus 800 according to some example implementations of the present disclosure. Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, a processor 802 (e.g., processor unit) connected to a memory 804 (e.g., storage device).

The processor 802 is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 804 (of the same or another apparatus).

The processor 802 may be a number of processors, a multi-core processor or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more ASICs, FPGAs or the like. Thus, although the processor may be capable of executing a computer program to perform one or more functions, the processor of various examples may be capable of performing one or more functions without the aid of a computer program.

The memory 804 is generally any piece of computer hardware that is capable of storing information such as, for example, data, computer programs (e.g., computer-readable program code 806) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 804, the processor 802 may also be connected to one or more interfaces for displaying, transmitting and/or receiving information. The interfaces may include a communications interface 808 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 810 and/or one or more user input interfaces 812 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by a processor, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. In this manner, an apparatus 800 may include a processor 802 and a computer-readable storage medium or memory 804 coupled to the processor, where the processor is configured to execute computer-readable program code 806 stored in the memory. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising a processor and a memory storing executable instructions that, in response to execution by the processor, cause the apparatus to at least:
   receive a task card manual with first maintenance data including a description of maintenance tasks on or using parts of a manufactured product, and an illustrated parts catalog with second maintenance data including a description of parts of the manufactured product;
   extract the first maintenance data from the task card manual, and the second maintenance data from the illustrated parts catalog;
   correlate the first maintenance data and second maintenance data so extracted to produce aggregated maintenance data including the first maintenance data and second maintenance data, correlation of the first maintenance data and second maintenance data including correlation of items of the first maintenance data and items of the second maintenance data;
   configure a storage with the aggregated maintenance data to enable a query of the aggregated maintenance data;
   receive an electronic document with third maintenance data regarding the manufactured product;
   extract the third maintenance data from the electronic document;
   correlate the aggregated maintenance data and the third maintenance data so extracted to produce further aggregated maintenance data including the aggregated maintenance data and third maintenance data, correlation of the aggregated maintenance data and third maintenance data including correlation of the items of the first maintenance data and items of the third maintenance data, and thereby correlation of the items of the second maintenance data and the items of the third maintenance data, the items of the third maintenance data otherwise being incapable of correlation with the items of the second maintenance data; and
   configure the storage with the further aggregated maintenance data to enable a query of the further aggregated maintenance data.

2. The apparatus of claim 1, wherein the first maintenance data and second maintenance data are in a markup language format, and items of the first maintenance data and items of the second maintenance data are encapsulated by tags of the markup language format, and
   wherein the apparatus being caused to correlate the first maintenance data and second maintenance data includes being caused to correlate the items of first maintenance data and items of the second maintenance data based at least in part on the tags.

3. The apparatus of claim 1, wherein the first maintenance data is in a markup language format, and the apparatus being caused to correlate the first maintenance data and second maintenance data includes being caused to recognize items of the first maintenance data and their relationship to items of the second maintenance data independent of the markup language format.

4. The apparatus of claim 1, wherein the memory stores further executable instructions that, in response to execution by the processor, cause the apparatus to further at least:
   receive a search query;
   execute the search query on the aggregated maintenance data, including retrieval of items of first maintenance data and correlated items of second maintenance data; and
   produce a response to the search query including the items of first maintenance data and correlated items of second maintenance data.

5. The apparatus of claim 1,
   wherein the memory stores further executable instructions that, in response to execution by the processor, cause the apparatus to further at least:
   receive a search query for a task card from the task card manual;
   execute the search query on the aggregated maintenance data, including retrieval of a description of a maintenance task covered by the task card from the first maintenance data, and a list of parts for the maintenance task from the second maintenance data; and
   produce a response to the search query including the description of the maintenance task and the list of parts for the maintenance task.

6. A method comprising:
   receiving a task card manual with first maintenance data including a description of maintenance tasks on or using parts of for a manufactured product, and an illustrated parts catalog with second maintenance data including a description of parts of the manufactured product;
   extracting the first maintenance data from the task card manual, and the second maintenance data from the illustrated parts catalog;
   correlating the first maintenance data and second maintenance data so extracted to produce aggregated maintenance data including the first maintenance data and second maintenance data, correlation of the first maintenance data and second maintenance data including correlation of items of the first maintenance data and items of the second maintenance data;
   configuring a storage with the aggregated maintenance data to enable a query of the aggregated maintenance data;
   receiving an electronic document with third maintenance data regarding the manufactured product;
   extracting the third maintenance data from the electronic document;
   correlating the aggregated maintenance data and the third maintenance data so extracted to produce further aggregated maintenance data including the aggregated maintenance data and third maintenance data, correlation of the aggregated maintenance data and third maintenance data including correlation of the items of the first maintenance data and items of the third maintenance data, and thereby correlation of the items of the second maintenance data and the items of the third maintenance data, the items of the third maintenance data otherwise being incapable of correlation with the items of the second maintenance data; and
   configuring the storage with the further aggregated maintenance data to enable a query of the further aggregated maintenance data.

7. The method of claim 6, wherein the first maintenance data and second maintenance data are in a markup language format, and items of the first maintenance data and items of the second maintenance data are encapsulated by tags of the markup language format, and
   wherein correlating the first maintenance data and second maintenance data includes correlating the items of first maintenance data and items of the second maintenance data based at least in part on the tags.

8. The method of claim 6, wherein the first maintenance data is in a markup language format, and correlating the first maintenance data and second maintenance data includes recognizing items of the first maintenance data and their relationship to items of the second maintenance data independent of the markup language format.

9. The method of claim 6 further comprising:
receiving a search query;
executing the search query on the aggregated maintenance data, including retrieving items of first maintenance data and correlated items of second maintenance data; and
producing a response to the search query including the items of first maintenance data and correlated items of second maintenance data.

10. The method of claim 6 further comprising:
receiving a search query for a task card from the task card manual;
executing the search query on the aggregated maintenance data, including retrieval of a description of a maintenance task covered by the task card from the first maintenance data, and a list of parts for the maintenance task from the second maintenance data; and
producing a response to the search query including the description of the maintenance task and the list of parts for the maintenance task.

11. A computer-readable storage medium that is non-transitory and has computer-readable program code portions stored therein that in response to execution by a processor, cause an apparatus to at least:
receive a task card manual with first maintenance data including a description of maintenance tasks on or using parts of a manufactured product, and an illustrated parts catalog with second maintenance data including a description of parts of the manufactured product;
extract the first maintenance data from the task card manual, and the second maintenance data from the illustrated parts catalog;
correlate the first maintenance data and second maintenance data so extracted to produce aggregated maintenance data including the first maintenance data and second maintenance data, correlation of the first maintenance data and second maintenance data including correlation of items of the first maintenance data and items of the second maintenance data;
configure a storage with the aggregated maintenance data to enable a query of the aggregated maintenance data;
receive an electronic document with third maintenance data regarding the manufactured product;
extract the third maintenance data from the electronic document;
correlate the aggregated maintenance data and the third maintenance data so extracted to produce further aggregated maintenance data including the aggregated maintenance data and third maintenance data, correlation of the aggregated maintenance data and third maintenance data including correlation of the items of the first maintenance data and items of the third maintenance data, and thereby correlation of the items of the second maintenance data and the items of the third maintenance data, the items of the third maintenance data otherwise being incapable of correlation with the items of the second maintenance data; and
configure the storage with the further aggregated maintenance data to enable a query of the further aggregated maintenance data.

12. The computer-readable storage medium of claim 11, wherein the first maintenance data and second maintenance data are in a markup language format, and items of the first maintenance data and items of the second maintenance data are encapsulated by tags of the markup language format, and
wherein the apparatus being caused to correlate the first maintenance data and second maintenance data includes being caused to correlate the items of first maintenance data and items of the second maintenance data based at least in part on the tags.

13. The computer-readable storage medium of claim 11, wherein the first maintenance data is in a markup language format, and the apparatus being caused to correlate the first maintenance data and second maintenance data includes being caused to recognize items of the first maintenance data and their relationship to items of the second maintenance data independent of the markup language format.

14. The computer-readable storage medium of claim 11 having further computer-readable program code portions stored therein that in response to execution by the processor, cause the apparatus to further at least:
receive a search query;
execute the search query on the aggregated maintenance data, including retrieval of items of first maintenance data and correlated items of second maintenance data; and
produce a response to the search query including the items of first maintenance data and correlated items of second maintenance data.

15. The computer-readable storage medium of claim 9, wherein the computer-readable storage medium has further computer-readable program code portions stored therein that in response to execution by the processor, cause the apparatus to further at least:
receive a search query for a task card from the task card manual;
execute the search query on the aggregated maintenance data, including retrieval of a description of a maintenance task covered by the task card from the first maintenance data, and a list of parts for the maintenance task from the second maintenance data; and
produce a response to the search query including the description of the maintenance task and the list of parts for the maintenance task.

* * * * *